H. B. & I. G. FERGUSON.
TIRE PATCH.
APPLICATION FILED MAR. 14, 1916.

1,211,427.

Patented Jan. 9, 1917.

Witnesses

Inventor
H. B. Ferguson
I. G. Ferguson
By
Attorneys

UNITED STATES PATENT OFFICE.

HAROLD B. FERGUSON AND IVIN G. FERGUSON, OF NEWBURGH, NEW YORK.

TIRE-PATCH.

1,211,427.      Specification of Letters Patent.      Patented Jan. 9, 1917.

Application filed March 14, 1916. Serial No. 84,168.

*To all whom it may concern:*

Be it known that we, HAROLD B. FERGUSON and IVIN G. FERGUSON, citizens of the United States, residing at Newburgh, in the county of Orange, State of New York, have invented certain new and useful Improvements in Tire-Patches; and we do hereby declare the following to be a full, clear, and exact description of the invention, such as will enable others skilled in the art to which it appertains to make and use the same.

This invention relates to improvements in patches and particularly to patches used on pneumatic tires.

One object of the invention is to provide a novel device of this character which is simple and cheap in construction and effective in operation.

Another object is to provide a device of this character which is so constructed and arranged that it will not creep longitudinally or transversely on the tire.

Another object is to provide a novel and simple tire patch, of such construction that the same can be easily taken apart for repairs or the replacing of worn parts.

Other objects and advantages will be apparent from the following description when taken in connection with the accompanying drawing.

Figure 1:
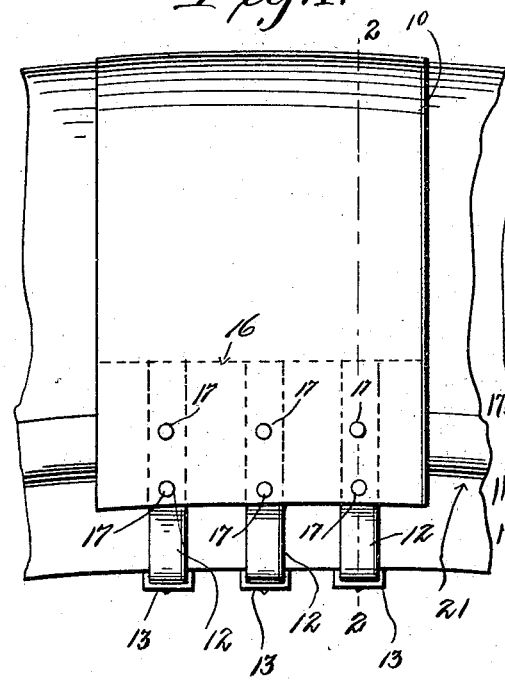
Figure 2:
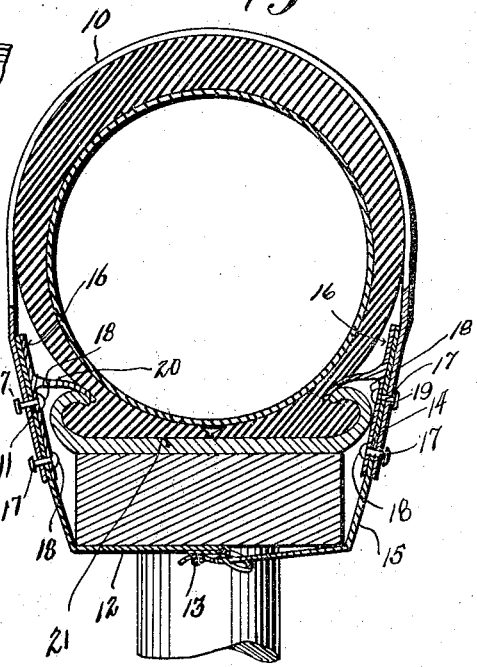
Figure 3:
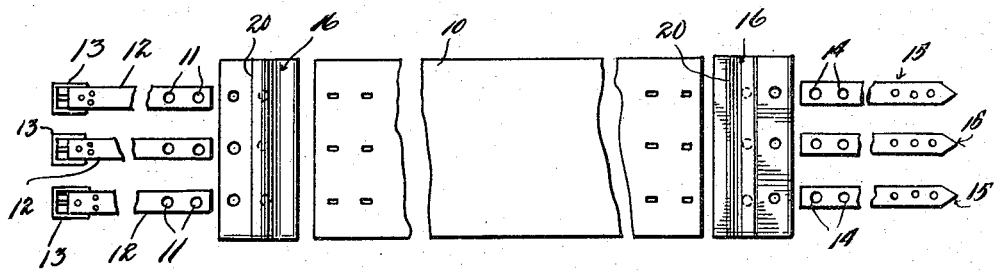
Figure 4:
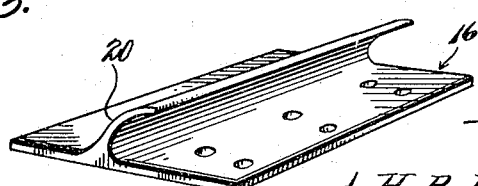

In the drawing: Figure 1 is a side elevation of a portion of a tire showing our invention applied thereto; Fig. 2 is a vertical section on the line 2—2 of Fig. 1; Fig. 3 is a bottom plan view of the patch removed; and Fig. 4 is a detail perspective view of one of the rim engaging hooks.

Referring particularly to the accompanying drawing, 10 represents a strip of combined canvas and rubber of the desired dimensions and thickness. Disposed at one end of the strip and having the eyelets 11 are the straps 12, the outer ends of which are provided with the buckles 13. Correspondingly disposed at the other end of the strip and having the eyelets 14 are the straps 15 which are adapted to be engaged with the buckles 13. Disposed on the under face of the strip, and at each end is a transversely extending metal plate 16 through which a plurality of pins 17 are adapted to be passed, said pins also being arranged to be passed through the eyelets as clearly shown in the drawing. One end of each of the pins is provided with a head 18, while the other end has a pivoted spring-pressed member 19 which is adapted to be swung into horizontal position to extend across the eyelet and prevent the pin being moved backwardly through the eyelet. On each of the before-mentioned plates 16 there is formed a transversely extending hook-shaped shoulder 20 which, when the strip is passed around the tire and the straps secured together beneath the rim 21, engage with the marginal edges of the rim at points where said edges grip the sides of the tire. These hook-shaped shoulders positively prevent the strip 10 from slipping around the tire transversely, or around the tire longitudinally. Thus the patch is held firmly in the proper position at all times.

Should the strip 10 wear out, the straps 12 and 15 and the plates 16 can be readily removed and applied to a new strip. Also, should the hook shoulders 20 of the plates 16 become broken, new plates can be quickly and easily applied in place of the old ones by the readily removable pins 17.

What is claimed is:

A tire patch of the class described comprising a strip of suitable fabric having openings in the ends thereof, straps disposed in overlapping relation upon the lower edges of the strip and having openings disposed in registration with the openings of the strip, plates disposed against the overlapping ends of the strip and the straps and provided with openings also registering with the aforementioned openings, each of said plates being formed with a hook engageable over the wheel rim to hold the said plate in spaced relation thereto, removable pins disposed through the registered openings for detachably connecting the strip, straps and plates together, and fastening means for adjustably connecting the ends of the straps together.

In testimony whereof, we affix our signatures in the presence of two witnesses.

HAROLD B. FERGUSON.
IVIN G. FERGUSON.

Witnesses:
HENRY W. CHADEAYNE,
WILLIAM J. WYGANT.

Copies of this patent may be obtained for five cents each, by addressing the "Commissioner of Patents, Washington, D. C."